(12) United States Patent
Maryamchik et al.

(10) Patent No.: US 9,939,178 B2
(45) Date of Patent: Apr. 10, 2018

(54) SOLIDS-BASED CONCENTRATED SOLAR POWER RECEIVER

(71) Applicant: Babcock & Wilcox Power Generation Group, Inc., Barberton, OH (US)

(72) Inventors: Mikhail Maryamchik, Fairlawn, OH (US); Thomas J Flynn, North Canton, OH (US); Shengteng Hu, Copley, OH (US); David L. Kraft, Massillon, OH (US); Jason M. Marshall, Wadsworth, OH (US); Bartev B. Sakadjian, North Canton, OH (US)

(73) Assignee: The Babcock & Wilcox Company, Baberton, OH (US)

( * ) Notice: Subject to any disclaimer, the term of this patent is extended or adjusted under 35 U.S.C. 154(b) by 745 days.

(21) Appl. No.: 14/507,103

(22) Filed: Oct. 6, 2014

(65) Prior Publication Data

US 2016/0097564 A1 Apr. 7, 2016

(51) Int. Cl.
| | |
|---|---|
| F24J 2/46 | (2006.01) |
| F24J 2/28 | (2006.01) |
| F24J 2/30 | (2006.01) |
| F24J 2/04 | (2006.01) |
| F03G 6/06 | (2006.01) |
| F24J 2/07 | (2006.01) |
| F24J 2/40 | (2006.01) |

(52) U.S. Cl.
CPC .............. *F24J 2/4649* (2013.01); *F03G 6/06* (2013.01); *F24J 2/0488* (2013.01); *F24J 2/0494* (2013.01); *F24J 2/07* (2013.01); *F24J 2/40* (2013.01); *F24J 2/4636* (2013.01); *F24J 2002/4603* (2013.01); *Y02E 10/41* (2013.01); *Y02E 10/44* (2013.01)

(58) Field of Classification Search
USPC .................................................. 126/644, 643
See application file for complete search history.

(56) References Cited

U.S. PATENT DOCUMENTS

| | | | |
|---|---|---|---|
| 3,908,632 A | 9/1975 | Poulsen | |
| 4,338,919 A * | 7/1982 | Hwang | ...................... F24J 2/23 126/640 |
| 7,338,919 B2 | 3/2008 | Kawahara et al. | |
| 2012/0160232 A1* | 6/2012 | Mitsuda | ..................... F24J 2/07 126/663 |

(Continued)

*Primary Examiner* — Avinash Savani
*Assistant Examiner* — Rabeeul Zuberi
(74) *Attorney, Agent, or Firm* — Michael J. Seymour

(57) ABSTRACT

A concentrated solar power (CSP) system includes channels arranged to convey a flowing solids medium descending under gravity. The channels form a light-absorbing surface configured to absorb solar flux from a heliostat field. The channels may be independently supported, for example by suspension, and gaps between the channels are sized to accommodate thermal expansion. The light absorbing surface may be sloped so that the inside surfaces of the channels proximate to the light absorbing surface define downward-slanting channel floors, and the flowing solids medium flows along these floors. Baffles may be disposed inside the channels and oriented across the direction of descent of the flowing solids medium. The channels may include wedge-shaped walls forming the light-absorbing surface and defining multiple-reflection light paths for solar flux from the heliostat field incident on the light-absorbing surface.

29 Claims, 8 Drawing Sheets

(56) References Cited

U.S. PATENT DOCUMENTS

2013/0255667 A1    10/2013  Ma et al.
2013/0257056 A1*   10/2013  Ma .......................... F03G 6/065
                                                              290/52
2013/0284163 A1*   10/2013  Flamant ................ B01J 8/1809
                                                              126/634

* cited by examiner

SECTION A

SECTION B

SECTION C

SOLIDS-BASED CONCENTRATED SOLAR POWER RECEIVER

The United States Government may have certain rights to this invention pursuant to contract number DE-AC36-08GO28308 between the United States Department of Energy and Alliance for Sustainable Energy, LLC. This invention was developed under subcontract ZGJ-3-23315-01 between Alliance For Sustainable Energy, LLC. and Babcock & Wilcox Power Generation Group, Inc. under contract number DE-AC36-08GO28308.

BACKGROUND

The following pertains to the solar power generation arts and related arts. In a known concentrated solar power (CSP) system design, a field of heliostats concentrates solar power onto a (typically tower-mounted) solar receiver. A flowing solids medium, such as silica sand or calcined flint clay with particle size on the order of a few hundred microns, flows through the solar receiver. This flowing solids medium absorbs energy from the concentrated light and is thus heated. The hot flowing solids medium may be used for various purposes, for example being fed into a fluidized-bed boiler to generate steam for driving an electrical generator turbine.

Some such solar concentrators are described, by way of non-limiting illustrative example, in Ma, U.S. Pub. No. 2013/0257056 A1 published Oct. 3, 2013 which is incorporated herein by reference in its entirety, and in Ma et al., U.S. Pub. No. 2013/0255667 A1 published Oct. 3, 2013 which is incorporated herein by reference in its entirety, and in Maryamchik et al., "Concentrated Solar Power Solids-Based System", U.S. Ser. No. 14/250,160 filed Apr. 10, 2014 which is incorporated herein by reference in its entirety.

BRIEF SUMMARY

In some aspects disclosed herein, a concentrated solar power (CSP) system comprises a plurality of channels, a cold solids source, and a hot solids receiving structure. The plurality of channels collectively form a shell structure having an outward-facing solar receiving surface shaped to define multiple reflection light paths for solar radiation impinging on the solar receiving surface. In a given CSP system the shell can be of a particular shape, such as a cylindrical shape or of a conical shape or a segment of a cylinder or a cone, etc. The cold solids source is arranged to feed a flowing solids medium into open upper ends of the channels. The hot solids receiving structure is arranged underneath the plurality of channels to receive the flowing solids medium exiting open lower ends of the channels. The channels are oriented so that the flowing solids medium fed into the open upper ends of the channels descends downward under gravity through the channels to exit the open lower ends of the channels. In some illustrative embodiments herein, the solar receiving surfaces of the channels comprise wedge-shaped surfaces defining multiple reflection light paths between the wedge shaped surfaces of neighboring channels. The wedge-shaped surfaces can be plane or convex or concave. In some embodiments the shell structure includes gaps between neighboring channels, and the gaps are sized to accommodate thermal expansion of the channels as the channels are heated from ambient temperature to an operational temperature of the channels. In some embodiments, the channels are oriented at an angle respective to the direction of gravity such that the flowing solids medium descending under gravity through the channels flows along the inside surface of the channel proximate to the outward-facing solar receiving surface. In some embodiments, baffle elements are disposed to uniformly disperse the solids medium inside the channels. The flowing solids medium may, for example be silica sand or calcined flint clay. The flowing solids medium in some embodiments has a particle size ranging from a few microns to a few millimeters. In another embodiment, the flowing solids medium has a particle size ranging on the order of a few hundred microns.

In some further aspects disclosed herein, the CSP system includes a tower supporting the plurality of channels collectively forming the shell structure, and a heliostat field on the ground at least partially surrounding the tower and configured to concentrate solar radiation onto the solar receiving surface of the shell structure. The solar power system may further include a heat exchanger configured to transfer heat from the hot flowing solids medium to a second medium. The second medium may, for example, be water, air, or carbon dioxide. The water can be in liquid and/or steam state for systems using water at subcritical pressure or in homogeneous (single-phase) state for systems using water at supercritical pressure.

In some aspects disclosed herein, a concentrated solar power (CSP) system comprises a plurality of channels arranged to convey a flowing solids medium descending under gravity through the channels. The channels form a light-absorbing surface configured to absorb at least 50% of solar flux from a heliostat field incident on the light-absorbing surface. In some embodiments the plurality of channels are arranged to form the light-absorbing surface as an outwardly facing shell surface. The outwardly facing shell surface of the receiver may be a toothed surface defining multiple reflection paths for solar flux from the heliostat field incident on the light-absorbing surface. The channels may be independently supported, for example by suspension from an overhead structure, and may have gaps between the channels sized to accommodate growth of the channels due to thermal expansion as they heat up by the solar flux and transfer heat to the flowing solids medium descending under gravity through the channels. In some embodiments the light absorbing surface is sloped so that the inside surfaces of the channels proximate to the light absorbing surface define downward-slanting channel floors, and the flowing solids medium descending under gravity through the channels flows along the downward-slanting channel floors. Baffles may be disposed inside the channels and oriented across the direction of descent of the flowing solids medium descending under gravity through the channels. In some embodiments the baffles do not contact the inside walls of the channel. The channels may include wedge-shaped walls forming the light-absorbing surface, and the wedge shaped walls may define multiple-reflection light paths for solar flux from the heliostat field incident on the light-absorbing surface.

These and other non-limiting aspects and/or objects of the disclosure are more particularly described below.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention. This disclosure includes the following drawings.

DETAILED DESCRIPTION OF THE PREFERRED EMBODIMENTS

Figure 1:
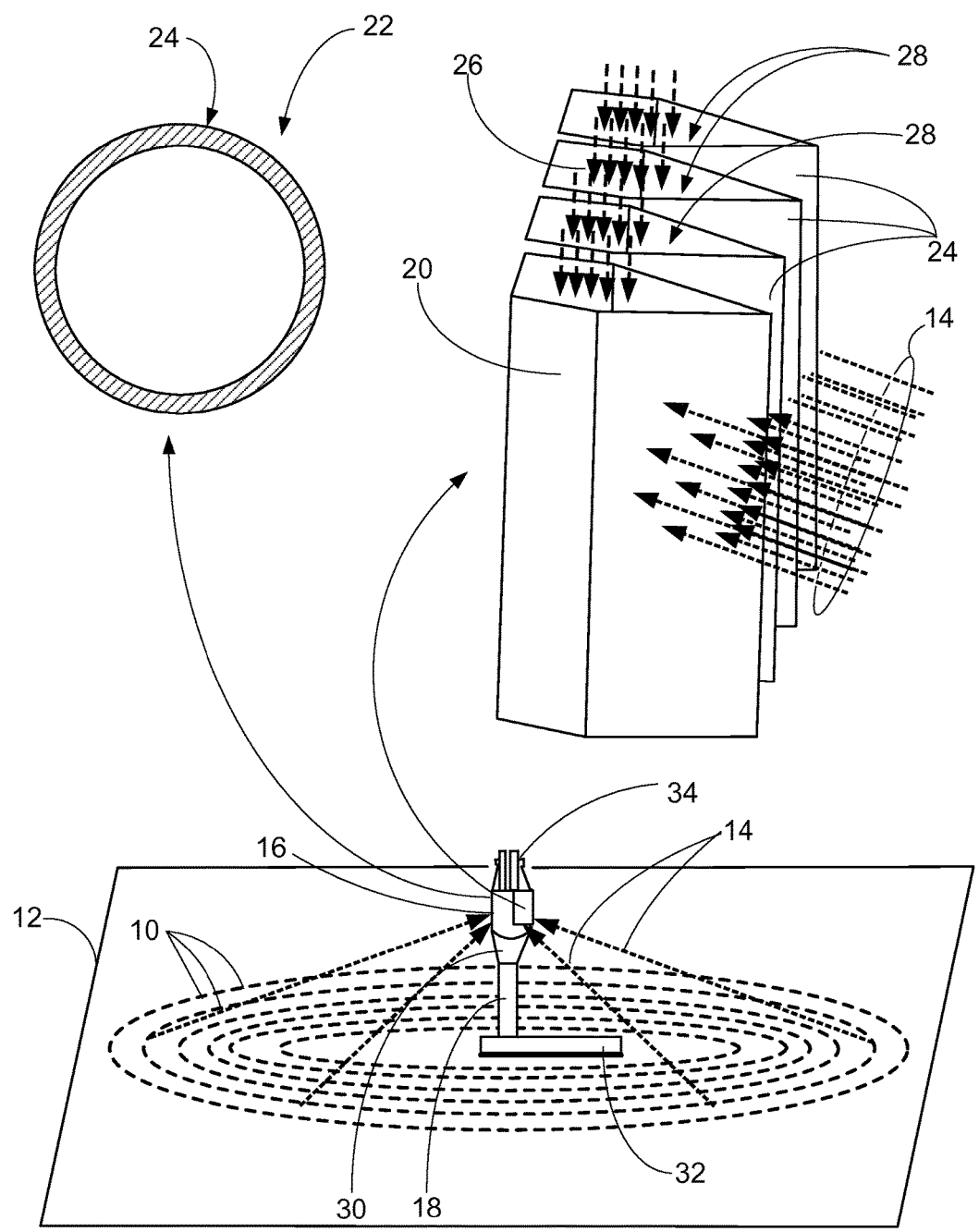
FIG. 1 diagrammatically shows an illustrative concentrated solar power (CSP) power generation facility, with an enlarged overhead view of the solar receiver shown in the upper left inset, and an enlarged perspective view of four channels of the solar receiver shown in the upper right inset.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

A value modified by a term or terms, such as "about" and "substantially," may not be limited to the precise value specified.

It should be noted that many of the terms used herein are relative terms. For example, the terms "interior", "exterior", "inward", and "outward" are relative to a center, and should not be construed as requiring a particular orientation or location of the structure.

The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other.

The term "plane" is used herein to refer generally to a common level, and should be construed as referring to a volume, not as a flat surface.

To the extent that explanations of certain terminology or principles of the solar receiver, boiler and/or steam generator arts may be necessary to understand the present disclosure, the reader is referred to Steam/its generation and use, 40th Edition, Stultz and Kitto, Eds., Copyright 1992, The Babcock & Wilcox Company, and to Steam/its generation and use, 41st Edition, Kitto and Stultz, Eds., Copyright 2005, The Babcock & Wilcox Company, the texts of which are hereby incorporated by reference as though fully set forth herein.

With reference to FIG. 1, a concentrated solar power (CSP) receiver system or power plant includes a field of heliostats 10 disposed over an area 12 occupied by the plant. The heliostats 10 are diagrammatically represented in FIG. 1, and typically include suitable components (not shown) such as beam-forming optics typically comprising mirrors or other reflectors and beam-steering apparatus such as multi-axis motorized system that cooperate to capture solar radiation impinging upon the heliostat and form the light into energy beams 14 that are directed to a solar receiver 16, with the multi-axis motorized systems of the heliostats 10 operating to track the (apparent) movement of the sun across the sky to keep the light beams 14 directed to the solar receiver 16 over the course of the day. (As used herein, the terms such as "light", "solar radiation", "solar flux", and "solar energy" are used interchangeably, and encompass all energy from the sun that is captured and concentrated by the heliostats 10 and/or other referenced system components whether such solar energy is in the form of visible light, infrared light, or ultraviolet light. In the case of components that are heated by solar radiation, the term "energy" or "solar energy" encompasses energy in the form of heat so generated.) In the illustrated configuration, the solar receiver 16 is mounted in an elevated position on a tower 18 so as to provide an unimpeded direct line-of-sight between each heliostat 10 in the field and the solar receiver 16.

With continuing reference to FIG. 1 including its upper left and upper right insets, the solar receiver 16 comprises a plurality of channels 20 (upper right inset) collectively forming a cylindrical shell structure 22 (diagrammatically indicated in the upper left inset) having an outward-facing solar receiving surface 24 designed to absorb a majority (i.e. at least 50%) of the solar flux from the heliostat field, and preferably more than a majority of the solar flux, for example more preferably designed to absorb at least 80% of the solar flux, and still more preferably designed to approximate a black body surface with nearly 100% absorption of the solar flux. The channels may, by way of illustrative example, be made of a metallic material, a ceramic material, or some other high operating temperature material(s). The outward-facing solar receiving surface 24 can be designed to efficiently absorb light by employing a surface with low reflectivity and high absorption for light in the solar spectrum. In some embodiments a light-absorbing coating such as a dark ceramic coating, a dual band absorbing coating, a broadband interference coating, or so forth, is incorporated into the solar receiving surface 24 to provide the desired surface absorption characteristics. In general, the surfaces of the channels may be flat, or curved, have indented grooves, or be otherwise shaped.

To further increase the light absorption efficiency, the solar receiving surfaces 24 of the illustrative channels 20 are shaped as seen in the upper right inset of FIG. 1 (see also FIG. 4), so as to define multiple reflection light paths for solar radiation impinging on the solar receiving surface 24. More particularly, the solar receiving surfaces 24 of the channels 20 comprise wedge-shaped surfaces. As best seen in FIG. 1, upper right inset, and FIG. 4, such channels 20 arranged close together in parallel define multiple reflection light paths 14R (shown in FIG. 4) between the wedge shaped surfaces of neighboring channels 20. As further seen in FIG. 4, the channels 20 are arranged closely together but spaced apart by a small gap G between neighboring channels. The gaps G allows independent thermal expansion of each channel 20 as the channels are heated from ambient temperature to a temperature greater than the temperature of the hot solids medium 26 flowing inside the channels 20. A suitable approach for sizing the gaps G is to compute (or empirically measure) the change in width of each channel 20 due to thermal expansion between ambient temperature and the design temperature for heated hot solids medium 26 with an added margin accounting for the higher temperature of the channel 20 compared to that of medium 26 (i.e. an operational temperature of the channels 20), that temperature difference being the driving force of the heat transfer from the channel 20 to the medium 26 (optionally plus some additional temperature to provide some tolerance) and making the gap G at ambient temperature at least as large as this change in width.

With continuing reference to FIG. 1, a flowing solids medium 26 flows into open upper ends 28 of the channels 20 and descends under gravity through the channels 20. The flowing solids medium 26 may, for example, comprise a flowing particulate medium, such as silica sand, calcined flint clay or other suitable heat transfer particle medium, with an average particle size on the order of a few hundred microns, but is not limited thereto, e.g. the particle size can range from a few microns (or smaller) to a few millimeters (or larger). As the flowing solids medium 26 descends under gravity through the channels 20, heat from the solar flux 14 absorbed at the solar receiving surface 24 transfers to the flowing solids medium 26 causing its temperature to rise. After flowing through the channels 20 and consequently heating up, the hot flowing solids medium exits openings 29 (shown in FIG. 2) at the bottoms of the channels 20. In some embodiments, the operating temperature of the flowing solids medium 26 achieved at the exit openings 29 is in the range 600° C. to 1100° C., and in one contemplated embodiment the operating temperature of the flowing solids medium 26 is 800° C.

The exiting hot flowing solids medium may be used for various purposes. In the illustrative system of FIG. 1, the heated flowing solids medium 26 exiting the lower opening 29 (shown in FIG. 2) of the solar receiver 16 enters a hot storage silo 30 and is transferred in metered fashion into a fluidized-bed boiler or other heat exchanger 32 shown diagrammatically in FIG. 1. The hot storage silo 30 provides thermal storage capability, as hot particles are stored in the silo 30 and may for example be used to provide thermal energy during cloudy days or at night. Thermal storage via the silo 30 decouples solar energy collection and electrical power production so as to allow dispatchable, continuous power production. The fluidized-bed boiler or heat exchanger 32 may, for example, comprise a bubbling fluidized bed (BFB) or circulating fluidized bed (CFB) heat exchanger or so forth, in which the heated flowing solids medium 26 is dispersed on the fluidized bed so as to heat water (to form steam) or another working fluid such as air or supercritical carbon dioxide (supercritical $CO_2$) to drive a power cycle and turbine-generator (not shown) to produce electrical power or to perform other useful work.

With continuing reference to FIG. 1, the flowing solids medium 26 is suitably returned to the top of the solar receiver 16 by any suitable elevator structure (not shown), for example driven by motors, diesel engines, or so forth. A cold solids distribution silo 34 located above the channels 20, or another cold solids source similarly located, provides metered flow of the flowing solids medium 26 into top openings of the channels 20 of the solar receiver 16 to complete the mass transport cycle of flowing solids medium 26.

With reference to FIGS. 2-5, an illustrative embodiment of the channels 20 is described. The channels 20 are supported by suspension via lugs 38, 39 from an overhead support structure 40. Each channel 20 includes the upper opening 28 through which the cold flowing solids medium 26 enters, and the lower opening 29 through which the flowing solids medium 26 exits after heating. The flowing solids medium 26 is metered (for example, to a group of channels 20 or individually to each channel 20) by a flow valve or other flow metering device 46 (see FIG. 3) from the cold solids hopper 34 into the upper openings 28 of the channels 20. The channels 20, and more particularly the outward facing solar receiving surfaces 24, receive solar flux 14 from the heliostats 10 that heats the channels 20. The heat absorbed by the channels 20 is transferred to the flowing solids medium 26 descending through channels 20 by thermal conduction and radiative heat transfer. The heated flowing solids medium 26 descends through the length of the channels 20 and exits the lower openings 29 to fall by gravity into the hot storage silo 30 or other hot solids receiving structure. The metering device 46 can be a mechanical device, such as a rotary valve, hopper discharge gate, or a non-mechanical device, such as an L-valve.

Figure 4:
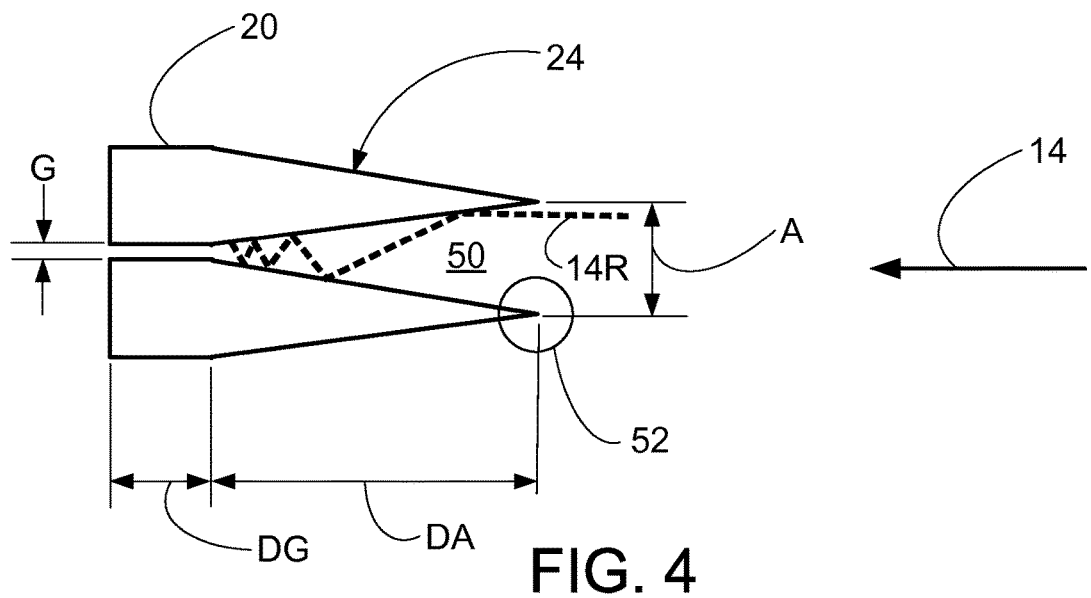
FIG. 4 diagrammatically shows a sectional view of two neighboring channels of the solar receiver of FIG. 1, illustrating a wedge-shaped light-receiving aperture defined between the adjacent channels.

The solar receiving surfaces 24 of the channels 20 are designed as wedges to enhance absorption of solar radiation 14 by way of multiple reflection paths 14R as best seen in FIG. 4. Each pair of two neighboring wedges define a wedge-shaped light-receiving aperture 50 labeled in FIG. 4, with aperture depth labeled "DA" and aperture width labeled "A". The ratio of depth DA to width A of the aperture 50 (ratio DA/A) is selected to provide the multiple reflection path 14R of solar radiation 14 within the light-receiving aperture 50 which minimizes reflection losses outside of the solar receiver 16. While the surfaces of the illustrative wedges are straight, more generally the wedge-shaped surfaces can be plane or convex or concave.

Figure 5:
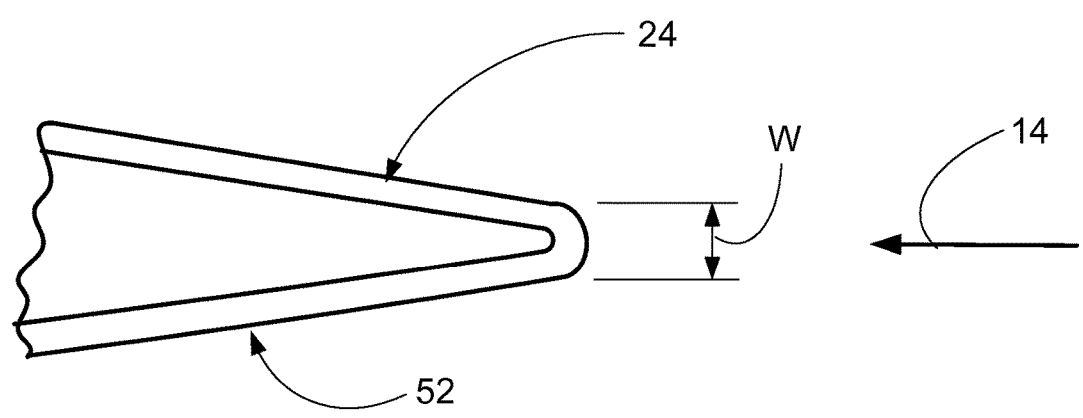
FIG. 5 diagrammatically shows a sectional view of the tip of a wedge-shaped solar-receiving surface of one channel of FIG. 4.

FIG. 5 shows an enlarged view of the tip 52 of the wedge-shaped solar-receiving surface 24 of one channel 20 (as indicated in FIG. 4). Light reflection losses outside of the receiver 16 are optionally further reduced by minimizing the width "W" of this tip 52. This reduced light reflection loss is due to the surface of the tip 52 being approximately perpendicular to the direction of solar radiation 14—thus, any light impinging on the tip 52 is likely to be lost by reflection. The width W of the tip 52 is suitably selected to be as small as practicable while still providing reasonable manufacturing tolerances and avoiding concentrated stresses that can promote cracking at the tip, and being wide enough to allow the flowing solids medium 26 to flow close to the tip. By using these geometrical design techniques along with a suitably light-absorbing surface material for the solar receiving surface 24, the radiative properties of the collective solar radiation receiving surface 24 of the cylindrical shell structure 22 defined by the multitude of channels 20 can approach those of a black body, while providing unobstructed flow of the solids medium 26 within the channels 20. While the illustrative shell structure 22 is cylindrical, the shell structure can have other geometries, typically chosen to comport with the layout of the heliostat field, such as having the shape of a cylinder, square, or so forth. The geometry of the shell structure is preferably chosen to maximize solar power received from the heliostat field.

Figure 3:
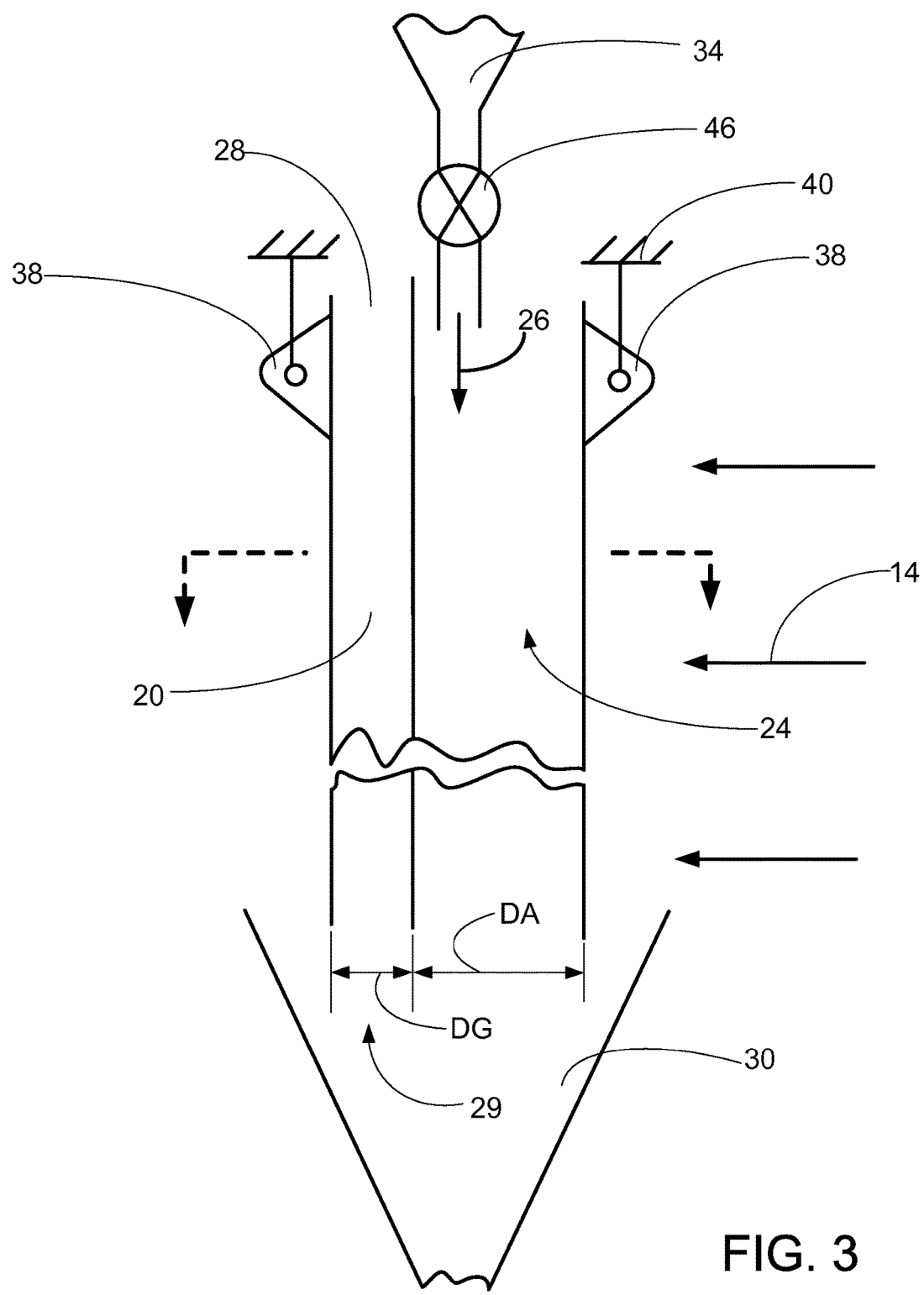
FIG. 3 diagrammatically shows a side sectional view of the channel of FIG. 2, with the baffle insert omitted, and further showing a cold solids source arranged above the channel to feed a flowing solids medium into an open upper end of the channel, and a hot solids receiving structure underneath the channel to receive flowing solids medium exiting an open lower end of the channel.

With particular reference to FIG. 3, the position of each channel 20 relative to the hot solids hopper 30 allows its unobstructed expansion downstream. The depth of the gap (DG, labeled in FIG. 4), and/or its shape, is selected to minimize solar radiation penetration between channels 20 to a practically insignificant level. For example, the gap depth DG is made sufficiently long so that extension of the multiple reflection path 14R through the gap (for light that fails to be absorbed in the aperture 50) produces enough reflections to obtain essentially 100% light absorption.

Efficient transfer of solar energy to the flowing solids medium 26 entails high absorption of light at the solar receiving surface 24, and efficient heat transfer from the walls of channels 20 to the solids medium 24 descending under gravity through the channels 20. Efficient heat transfer to the solids medium 24 reduces the temperature difference between the walls of the channels 20 and the flowing solids medium 26 thus allowing the solar receiver 16 to yield a high solids temperature. This in turn supports high working fluid temperatures in the power cycle, e.g. in the heat exchanger 32, thereby increasing cycle efficiency for a given allowable temperature of the walls of the channels 20. Inversely, efficient heat transfer can allow the maximum wall temperature of the channels 20 to be reduced for a given design-basis solids temperature, which improves reliability of the solar receiver 16 as the lower channel temperature reduces likelihood of thermally-induced structural failure. Heat transfer from the channels 20 to the flowing solids medium 26 can be improved by increasing the thermal conduction component of the heat transfer by providing strong engagement of the solids medium 26 with the inside surfaces of the channel 20, and especially with inside surface of the channel 20 proximate to the outward-facing solar receiving surface 24. In other words, the solids medium 26 flowing inside the channels 20 preferably has significant contact (i.e. engagement) with the inside surfaces of the channel 20, especially those inside surfaces proximate to the solar receiving surface 24. Using a particle medium with average particle size on the order of a few hundred microns reduces the contact time required to completely heat the particles.

Figure 2:
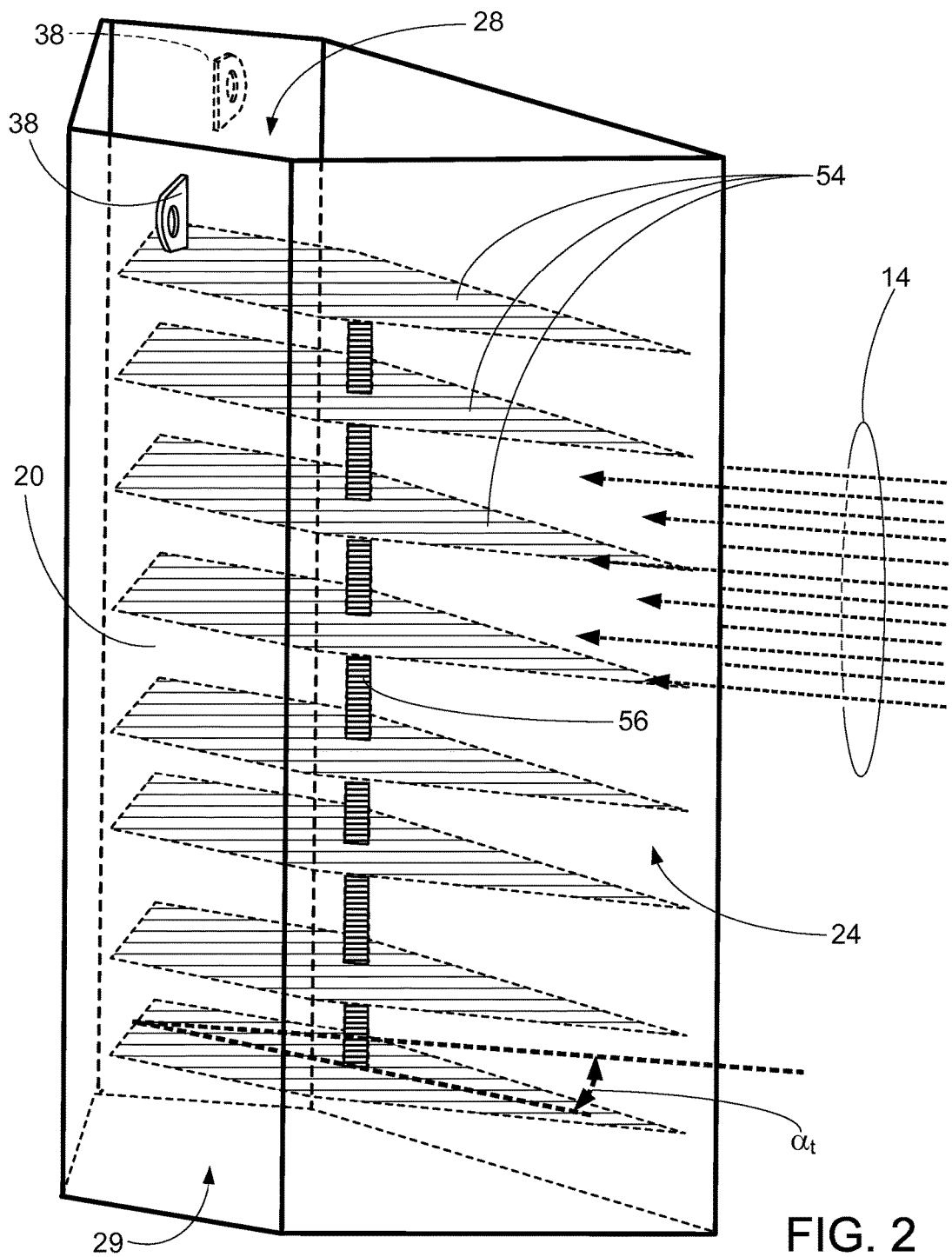
FIG. 2 diagrammatically shows a perspective view with dashed hidden lines of one channel of the solar receiver of FIG. 1, with an illustrative baffle insert also shown.

With particular reference to FIG. 2, such engagement is reduced by rapid descent under gravity of the flowing solids medium 26 through the channels 20. One way to improve the engagement, and hence the thermal transfer, is to provide baffles within the channels 20 that slow the descent of the solids medium 26. Such baffles can take various forms, such as protrusions extending from the inside surfaces of the channel 20 into the channel interior, or an illustrative baffle insert, including baffle plates 54 tied together by a connecting rod 56 that is inserted into the channel 20. Such a baffle insert can be a rigid structure as shown, or can be a baffling medium such as solid spheres of heat-resistant glass or another material disposed in the channel 20 and having diameters much larger than the particulate size range of the flowing solids medium 26. In either case, the baffle insert is suitably secured to the inside surfaces of the channel 20, and/or is retained in the channel 20 by a screen (not shown) covering the lower opening 29 of the channel 20. (Note that in such an embodiment the lower opening 29 is still an open lower end because the screen has openings sized to pass the flowing solids medium 26, while retaining the baffle insert in the channel 20).

In FIG. 1, upper right inset, and in FIGS. 2 and 3, the channels 20 are oriented vertically. This results in approximately equal engagement of the flowing solids medium 26 with all interior surfaces of the channel 20. On the other hand, for efficient heat transfer from the channel 20 to the solids medium 26 it is advantageous to bias the engagement to be stronger at the inside surface which is proximate the outward-facing solar receiving surface 24. The illustrative baffle insert shown in FIG. 2 achieves this by arranging the baffle plates 54 tilted downward at an angle $\alpha_t$ toward the solar receiving surface 2. This tilt tends to drive the flowing solids medium 26 toward the inside surface proximate the solar receiving surface 24 as the medium 26 flows "downhill" on the top surfaces of the baffle plates 54. Alternatively, the baffles could be folded longitudinally to form an inverted "V" which would have the effect of forcing the solids toward the side and front surfaces of the solar receiver. These baffles could be tilted or horizontal within the channel 20.

Figure 6:
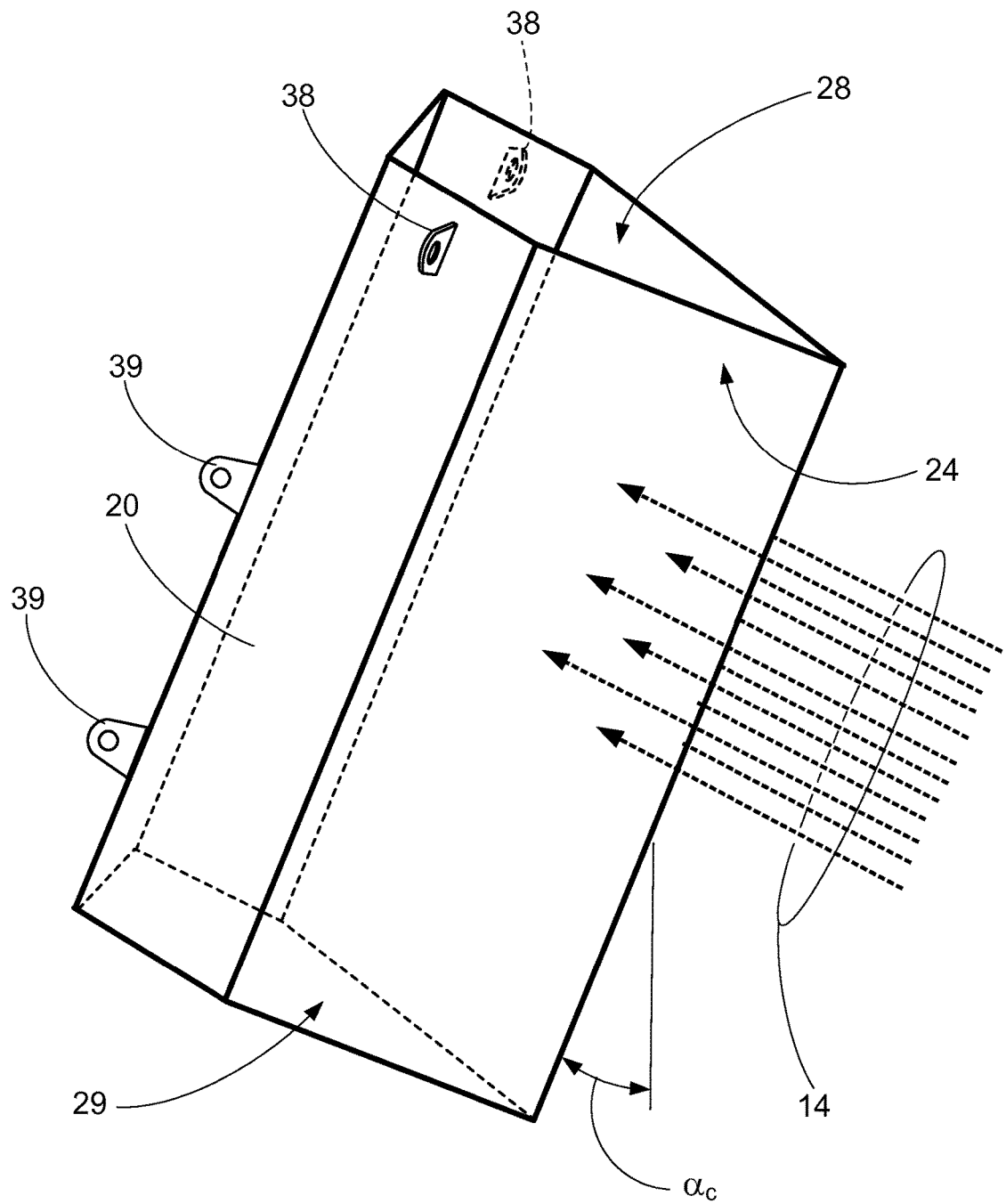
FIG. 6 diagrammatically shows a perspective view with dashed hidden lines of one channel of the solar receiver of FIG. 1, in which the channel is tilted at an angle $\alpha_c$ respective to the downward direction of gravity.
Figure 7:
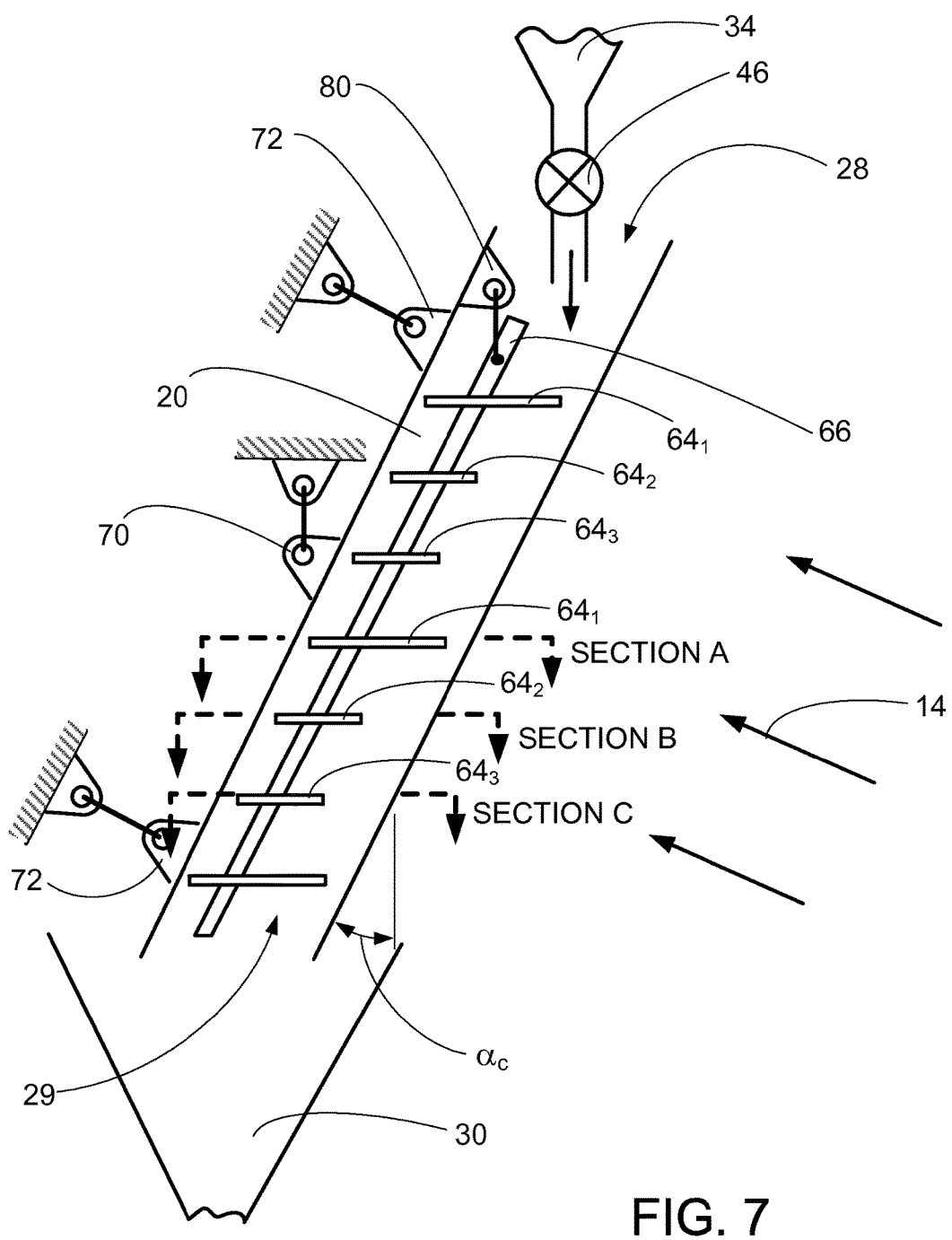
FIG. 7 diagrammatically shows a side sectional view of the channel of FIG. 6, with an illustrative baffle insert also shown, and further showing the cold solids source and the hot solids receiving structure.

With reference to FIGS. 6 and 7, another approach for biasing the flowing solids medium 26 to preferentially engage the inside surface proximate the solar receiving surface 24 is shown, in which the channels 20 are tilted at an angle $\alpha_c$ respective to the downward direction of gravity. In this way, the solar receiving surface 24 serves as a sloped "floor" of the channel 20. The flowing solids medium 26 is biased to flow closer to the solar receiving surface 24 thus providing more effective overall heating of the solids 26 flowing through the channel 20. As an additional benefit, the tilt at angle $\alpha_c$ may serve to place the solar receiving surface 24 closer to being perpendicular to the solar radiation 14 which impinges from an angle due to the heliostats 10 being at ground level while the solar receiver 16 is mounted at an elevated position on the tower 18 (see FIG. 1).

Sloping the channel 20 at an angle $\alpha_c$ provides preferential heating of the solids sliding along the tip of the heat absorbing part of its surface (that is, sliding along the inside surface proximate to the outward-facing solar absorbing surface 24). While this increases heat transfer efficiency, it can lead to non-uniform heating of the solids medium 26 as it descends under gravity through the channel 20.

Figure 8:
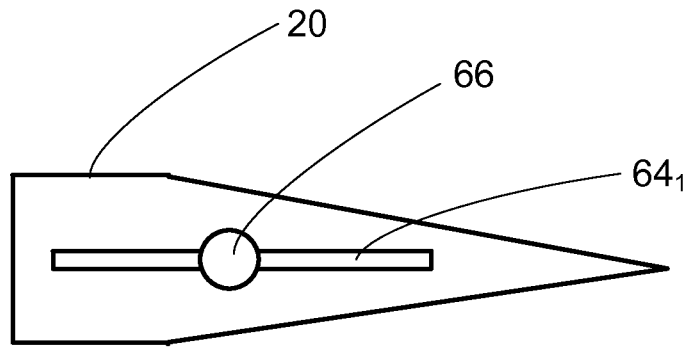
FIGS. 8-10 show the sectional views of FIG. 7 indicated in FIG. 7 as "Section A", "Section B", and "Section C", respectively.
Figure 9:
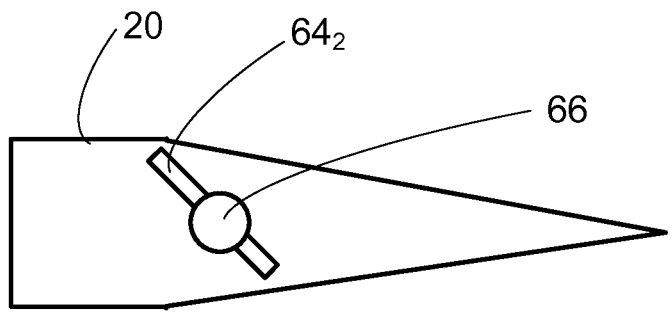
Figure 10:
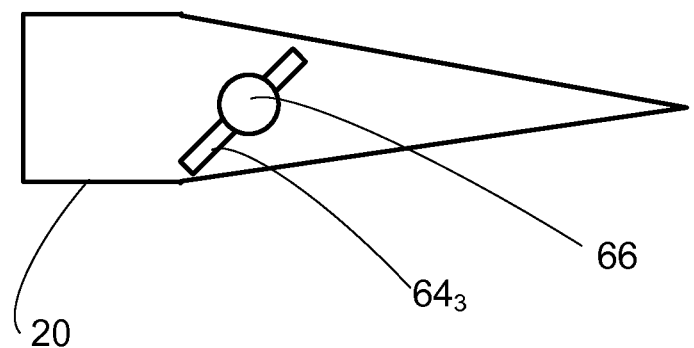

With continuing reference to FIG. 7 and with further reference to FIGS. 8-10, in order to increase uniformity of the heating, the baffles may be designed to introduce mixing of the flowing solids medium 26. In an illustrative baffle insert, this is achieved by suitable design of baffle elements 64 mounted on a connecting rod 66. The baffle elements 64 comprise a multitude of elements $64_1$, $64_2$, $64_3$ directed across the solids flow and forcing solids mixing within the cross section of the channel 20. The mixing is expected to improve uniformity of the temperature of the solids medium 26, as well as to improve uniformity of the temperature of the channel walls around the cross-sectional perimeter of the channel 20.

Placing baffle elements 64 in the path of the flowing solids medium 26 creates a void immediately downstream of each baffle element. If the baffle element touches the inside surface proximate to the outward-facing solar receiving surface 24, solids will disengage from that surface causing its temperature to increase. In order to avoid this, baffle elements 64 preferably do not touch the inside surface proximate to the outward-facing solar receiving surface 24. (This consideration also applies to the baffle elements 54 of the embodiment of FIG. 2).

To mix the flowing solids medium 26 across the depth of channel 20 (that is, from the "front" inside surface proximate the solar receiving surface 24 to the "rear" inside surface distal therefrom), the baffle elements 64 should provide the solids 26 with some impact directed to the rear. This can be achieved by placing the baffle elements 64 in planes close to horizontal (as opposed to planes perpendicular to axis of the channel 20).

The sloped channel 20 of the embodiment of FIGS. 6 and 7 is suitably supported in several locations along its length while allowed for thermal expansion. In the illustrative embodiment, this is accomplished by providing a support lug 70 at or near the middle (i.e. center of gravity) of the channel 20 that supports its weight, and at least one (and preferably two or more) additional support lugs 72 that provide the tilt angle $\alpha_c$ and prevent bending of the channel 20 while allowing axial thermal expansion. The illustrative weight supporting lug 70 is near the center of gravity, but more generally can be at the top, middle or bottom of channel 20.

With particular reference to FIG. 7, the weight of the baffle insert 64, 66 is preferably supported at the top of channel 20 via a support element 80, which in the illustrative embodiment is placed within the cross section of the channel 20 at the "rear" end, i.e. distal from the solar receiving surface 24. Additional support to maintain the connecting rod 66 parallel with the axis of the channel 20 may be provided by affixing some of the baffle elements 64 to the inside surfaces of the channel 20 or by providing additional dedicated support elements. Other support configurations are also contemplated—for example, a screen could again be placed over the open lower end 29 to retain the baffle insert 64, 66 while having screen openings sized to pass the particles making up the flowing solids medium 26.

Figure 11:
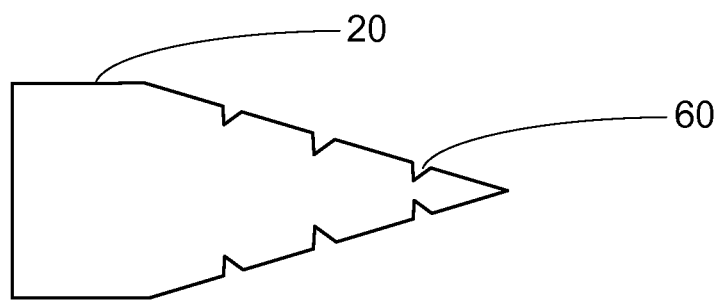
FIG. 11 diagrammatically shows a sectional view of one channel with stamped curves or indents 60.

It will be appreciated that other types of toothed surfaces defining multiple reflection paths for solar flux from the heliostat field incident on the light absorbing surface can be employed. For instance, with reference to FIG. 11 each individual channel can have a series of vertical grooved apertures (stamped curves or indents) defining multiple teeth 60 on the individual channel. These grooved apertures enhance mixing of the solids medium and slow down solids flow rate to increase residence time for better heat transfer performance. They also add heat transfer surfaces and prevent undesirable deformation of the channel when heated by solar flux.

Figure 12:
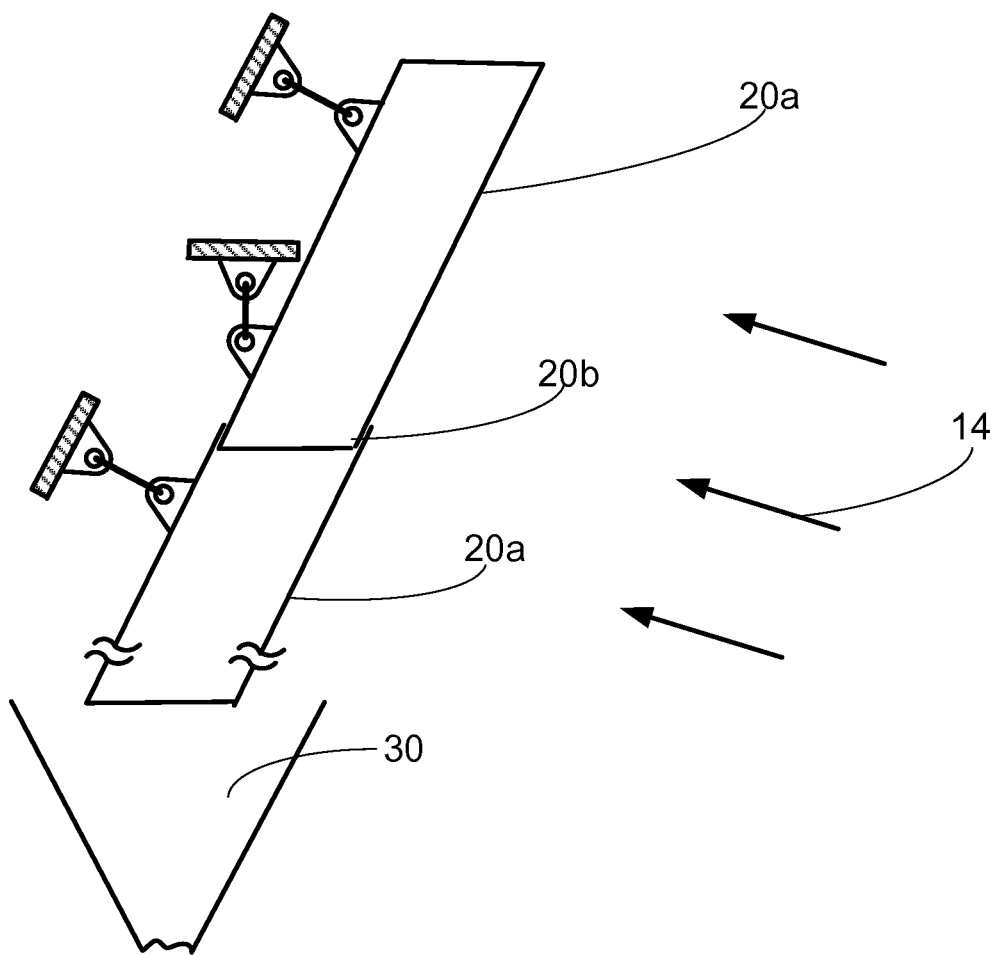
FIG. 12 diagrammatically shows a perspective view of two segmented channels 20A that are individually supported. The lower end 20B of each segment is tapered to allow for its growth into the adjacent segment when heated by solar flux.

With reference to FIG. 12, each individual receiver channel can be comprised of a plurality of segments 20A. Each segment is supported individually to allow for independent thermal expansion. One end of each segment 20B is tapered to allow for its growth into the adjacent segment when heated by solar flux. The design of each segment can be optimized with consideration to maintaining optical performance and ease of manufacturing and handling, and minimizing cost.

Illustrative embodiments including the preferred embodiments have been described. While specific embodiments have been shown and described in detail to illustrate the application and principles of the invention and methods, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims. Obviously, modifications and alterations will occur to others upon reading and understanding the preceding detailed description. It is intended that the present disclosure be construed as including all such modifications and alterations insofar as they come within the scope of the appended claims or the equivalents thereof.

We claim:

1. A concentrated solar power system comprising:
   a plurality of channels collectively forming a shell structure having an outward-facing solar receiving surface shaped to define multiple reflection light paths for solar radiation impinging on the solar receiving surface;
   a cold solids source arranged to feed a flowing solids medium into open upper ends of the channels; and
   a hot solids receiving structure arranged underneath the plurality of channels to receive the flowing solids medium exiting open lower ends of the channels;
   wherein the channels are oriented so that the flowing solids medium fed into the open upper ends of the channels descends downward under gravity through the channels to exit the open lower ends of the channels; and
   wherein each individual channel comprises a series of vertical grooved apertures defining multiple teeth on the individual channel; and
   baffles disposed inside the channels and oriented across the direction of descent of the flowing solids medium descending under gravity through the channels; and
   wherein the baffles do not contact the inside walls of the channel.

2. The concentrated solar power system of claim 1 wherein the solar receiving surfaces of the channels comprise wedge-shaped surfaces defining multiple reflection light paths between the wedge shaped surfaces of neighboring channels.

3. The concentrated solar power system of claim 1 wherein the shell structure includes gaps between neighboring channels, and the gaps are sized to accommodate thermal expansion of the channels as the channels are heated from ambient temperature to an operational temperature of the channels.

4. The concentrated solar power system of claim 1 wherein the channels are oriented at an angle respective to the direction of gravity such that the flowing solids medium descending under gravity through the channels flows along the inside surface of the channel proximate to the outward-facing solar receiving surface.

5. The concentrated solar power system of claim 1 further comprising baffle elements disposed inside the channels.

6. The concentrated solar power system of claim 5 wherein the baffle elements are spaced apart from an inside surface of the channel that is proximate to the outward-facing solar receiving surface.

7. The concentrated solar power system of claim 5 wherein the baffle elements are essentially horizontally oriented.

8. The concentrated solar power system of claim 1 wherein the channels are supported by suspension from an overhead support structure.

9. The concentrated solar power system of claim 1 further comprising:

a tower supporting the plurality of channels collectively forming the shell structure; and a heliostat field on the ground at least partially surrounding the tower and configured to concentrate solar radiation onto the solar receiving surface of the shell structure.

10. The concentrated solar power system of claim 1 further comprising:

a heat exchanger configured to transfer heat from the hot flowing solids medium to a second medium.

11. The concentrated solar power system of claim 10 wherein the second medium is one of water, air, and carbon dioxide.

12. The concentrated solar power system of claim 1 wherein the flowing solids medium comprises silica sand or calcined flint clay.

13. The concentrated solar power system of claim 1 wherein the flowing solids medium has particle size ranging from a few microns to a few millimeters.

14. A concentrated solar power system comprising:

a plurality of channels arranged to convey a flowing solids medium descending under gravity through the channels, a cold solids source arranged to feed a flowing solids medium into open upper ends of the channels; and a hot solids receiving structure arranged underneath the plurality of channels to receive the flowing solids medium exiting open lower ends of the channels;

wherein the channels form a light-absorbing surface configured to absorb at least 50% of solar flux from a heliostat field incident on the light-absorbing surface; and wherein the channel are independently supported by suspension from an overhead support structure; and baffles disposed inside the channels and oriented across the direction of descent of the flowing solids medium descending under gravity through the channels; and wherein the baffles do not contact the inside walls of the channel.

15. The concentrated solar power system of claim 14 wherein the plurality of channels are arranged to form the light-absorbing surface as an outwardly facing shell surface.

16. The concentrated solar power system of claim 14 further comprising:

a cold solids source arranged to feed the flowing solids medium into open upper ends of the channels; and a hot solids receiving structure arranged underneath the plurality of channels to receive the flowing solids medium from open lower ends of the channels.

17. The concentrated solar power system of claim 4 wherein the independently supported channels have gaps between the channels sized to accommodate thermal expansion of the channels due to heat transfer from the solar flux to the flowing solids medium descending under gravity through the channels.

18. The concentrated solar power system of claim 14 wherein:

the light absorbing surface is sloped so that the inside surfaces of the channels proximate to the light absorbing surface define downward-slanting channel floors; and the flowing solids medium descending under gravity through the channels flows along the downward-slanting channel floors.

19. The concentrated solar power system of claim 14 wherein the channels include wedge-shaped walls forming the light-absorbing surface.

20. The concentrated solar power system of claim 19 wherein the wedge shaped walls define multiple-reflection light paths for solar flux from the heliostat field incident on the light-absorbing surface.

21. The concentrated solar power system of claim 1 wherein the channels are made of a metallic material, a ceramic material, or some other high operating temperature materials.

22. The concentrated solar power system of claim 1 wherein the surface of channels is flat, or curved, and/or has indented grooves.

23. The concentrated solar power system of claim 1 wherein each individual channel comprises a plurality of segments.

24. The concentrated solar power system of claim 1 wherein the shell structure of the receiver formed by the channels takes the shape of a cylinder, a square, or other shapes.

25. The concentrated solar power system of claim 14 wherein the channels are made of a metallic material, a ceramic material, or some other high operating temperature materials.

26. The concentrated solar power system of claim 14 wherein the surface of channels is flat, or curved, and/or has indented groves.

27. The concentrated solar power system of claim 14 wherein each individual channel comprises a plurality of segments.

28. The concentrated solar power system of claim 1 wherein the flowing solids medium has particle size on the order of a few hundred microns.

29. A concentrated solar power system comprising:

a plurality of channels collectively forming a shell structure having an outward-facing solar receiving surface shaped to define multiple reflection light paths for solar radiation impinging on the solar receiving surface;

a cold solids source arranged to feed a flowing solids medium into open upper ends of the channels; and a hot solids receiving structure arranged underneath the plurality of channels to receive the flowing solids medium exiting open lower ends of the channels;

wherein the channels are oriented so that the flowing solids medium fed into the open upper ends of the channels descends downward under gravity through the channels to exit the open lower ends of the channels; and wherein each channel includes a plurality of baffle elements mounted on a connecting rod, and wherein each baffle element comprises a multitude of elements angled differently from an adjacent baffle element; and wherein the baffles do not contact the inside walls of the channel.

* * * * *